(12) United States Patent
Musiak et al.

(10) Patent No.: US 8,314,730 B1
(45) Date of Patent: Nov. 20, 2012

(54) COLLECTION OF METEOROLOGICAL DATA BY VEHICLES

(75) Inventors: Jeffery D. Musiak, Federal Way, WA (US); Brian J. Tillotson, Kent, WA (US); Charles B. Spinelli, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/967,966

(22) Filed: Dec. 14, 2010

(51) Int. Cl.
*G01S 13/00* (2006.01)

(52) U.S. Cl. .................................................. 342/25 B

(58) Field of Classification Search ..................... 342/26
See application file for complete search history.

(56) References Cited

U.S. PATENT DOCUMENTS

| | | | |
|---|---|---|---|
| 7,343,793 B2 | 3/2008 | Tillotson et al. | |
| 7,365,674 B2 | 4/2008 | Tillotson et al. | |
| 7,530,266 B2 | 5/2009 | Tillotson et al. | |
| 7,592,955 B2 | 9/2009 | Tillotson et al. | |
| 7,598,901 B2 | 10/2009 | Tillotson et al. | |
| 7,698,927 B2 | 4/2010 | Spinelli et al. | |
| 2002/0039072 A1* | 4/2002 | Gremmert et al. | 340/945 |
| 2007/0073486 A1* | 3/2007 | Tillotson et al. | 702/3 |
| 2007/0256491 A1 | 11/2007 | Tillotson et al. | |
| 2009/0273510 A1 | 11/2009 | Tillotson | |

* cited by examiner

*Primary Examiner* — Timothy A Brainard
(74) *Attorney, Agent, or Firm* — Toler Law Group

(57) ABSTRACT

Methods and mobile platforms are disclosed for using vehicles to gather meteorological data. A method identifies a location that is relevant to a particular meteorological model based on modeling parameters of the particular meteorological model. Meteorological data is collected aboard a vehicle. The meteorological data is indicative of a meteorological condition in an area within sensor range of the vehicle. At least a portion of the meteorological data is transmitted to a modeling station remote from the vehicle in response to determining that the vehicle is proximate the location.

20 Claims, 8 Drawing Sheets

COLLECTION OF METEOROLOGICAL DATA BY VEHICLES

FIELD OF THE DISCLOSURE

The present disclosure is generally related to collection of meteorological data.

BACKGROUND

Meteorological reporting and forecasting is supported by a myriad of data gathering devices, including radiosondes, based around the world. Satellites, meteorological research vehicles, and remote data gathering stations may supply meteorological data for some areas. Nonetheless, spatial and temporal gaps may exist in the meteorological data gathered by these facilities.

SUMMARY

Embodiments disclosed herein include methods and mobile platforms for collecting meteorological data. Vehicles, such as commercial aircraft and commercial oceangoing ships, may be used as mobile platforms to gather meteorological data. The vehicles may pass through locations that would otherwise not be examined by other meteorological data gathering systems. The vehicles also may pass through locations at times when these areas are not examined by other meteorological data gathering systems. The vehicle may relay the meteorological data to a weather tracking facility.

The meteorological data gathered may include local and remote data. The local data may be measureable at the vehicle and may include data such as wind speed, temperature, relative humidity, seas conditions, current precipitation, and other quantities measureable at the vehicle. The local data also may include phase shifts in known data transmissions, such as global positioning satellite (GPS) transmissions or Iridium satellite telephone signals, received at a current location of the vehicle. The remote data may include data measured away from the vehicle. For example, the remote data may be collected using radar to measure wind speed and direction or reflectivity at a distance from the vehicle. Weather phenomena such as wind speed and turbulence also may be measured using laser detection and ranging (LADAR). Radio frequency (RF) occultation may be used to determine temperature and humidity from refractivity at great distances.

A modeling grid may be created that identifies locations for which meteorological data is not collected in general or for which meteorological data is not collected at particular times. A vehicle may carry the modeling grid aboard. When the vehicle approaches a location for which the modeling grid indicates meteorological data may be needed, the vehicle may collect relevant meteorological data. Instead of the vehicle carrying the modeling grid aboard, the weather tracking facility may maintain the modeling grid and information regarding movements of the vehicle. When it is determined at the weather tracking facility that the vehicle is nearing a location for which the modeling grid indicates meteorological data may be needed, the weather tracking facility may send a request to the vehicle to collect and transmit meteorological data for that location.

Instead of transmitting raw data returned by radar or other systems to a processing facility, the raw data may be processed aboard the vehicle to distill relevant information about the meteorological conditions. The processed data subsequently may be relayed from the vehicle to the weather tracking facility. For example, the vehicle may transmit the meteorological data at one or more unused positions in data streams transmitted by the vehicle. It may be desirable to transmit the meteorological data in the unused positions so as not to interfere with data communications or telemetry sent by the vehicle for other purposes. In a particular embodiment, the processed data may be formatted to be in a form that is readily assimilated into an existing forecasting framework.

In a particular embodiment, a method identifies a location that is relevant to a particular meteorological model based on modeling parameters of the particular meteorological model. Meteorological data is collected aboard a vehicle. The meteorological data may be indicative of a meteorological condition in an area within sensor range of the vehicle. At least a portion of the meteorological data is transmitted to a modeling station remote from the vehicle in response to determining that the vehicle is proximate the location.

In another particular embodiment, a method includes identifying a data deficiency related to meteorological data descriptive of meteorological conditions at a first location using a meteorological modeling computing system. The method also includes identifying a vehicle that has on-board sensing equipment operable to acquire the meteorological data and that is projected to be proximate the first location. The method further includes sending a query to the vehicle. The method also includes receiving the meteorological data from the vehicle when the vehicle is proximate the first location.

In yet another particular embodiment, a mobile platform includes one or more sensors operable to collect raw data indicating meteorological conditions presently existing at one or more locations. A data processor is coupled to the sensors to receive the raw data from the one or more sensors and to generate processed data configured to represent the meteorological conditions presently existing at one or more locations used by a particular meteorological model. A transceiver is coupled to the data processor and configured to send the processed data to a receiving station.

The features, functions, and advantages that are described can be achieved independently in various embodiments or may be combined in yet other embodiments, further details of which are disclosed with reference to the following description and drawings.

DETAILED DESCRIPTION

Embodiments disclosed herein supplement meteorological data collected by dedicated weather stations with meteorological data collected by commercial aircraft, ships, and other vehicles. The vehicles may act as data-gathering mobile platforms that travel through unpopulated areas or other under-examined areas of the globe. A vehicle may be preprogrammed with information indicating locations at which the vehicle is to gather meteorological data. Alternatively, a weather tracking facility may send a request to the vehicle to gather meteorological data as the vehicle approaches a location for which data is desired. The meteorological data may include local data collected at the position of the vehicle. For example, local data may include temperature, current precipitation, sea conditions, or other information measureable directly at the vehicle. The meteorological data also may include remote data collected at a distance from the vehicle. For example, remote data may include data about wind or precipitable water content at a distance of the vehicle.

Raw data may be processed to distill relevant information about the weather conditions. The processed data may then be relayed to a weather tracking facility. To avoid interfering with other communications transmitted by the vehicle, the processed meteorological data may be transmitted in currently unused portions of data streams transmitted by the vehicle. The processed data may be formatted to be in a form that is readily assimilated into an existing forecasting framework.

Figure 1:
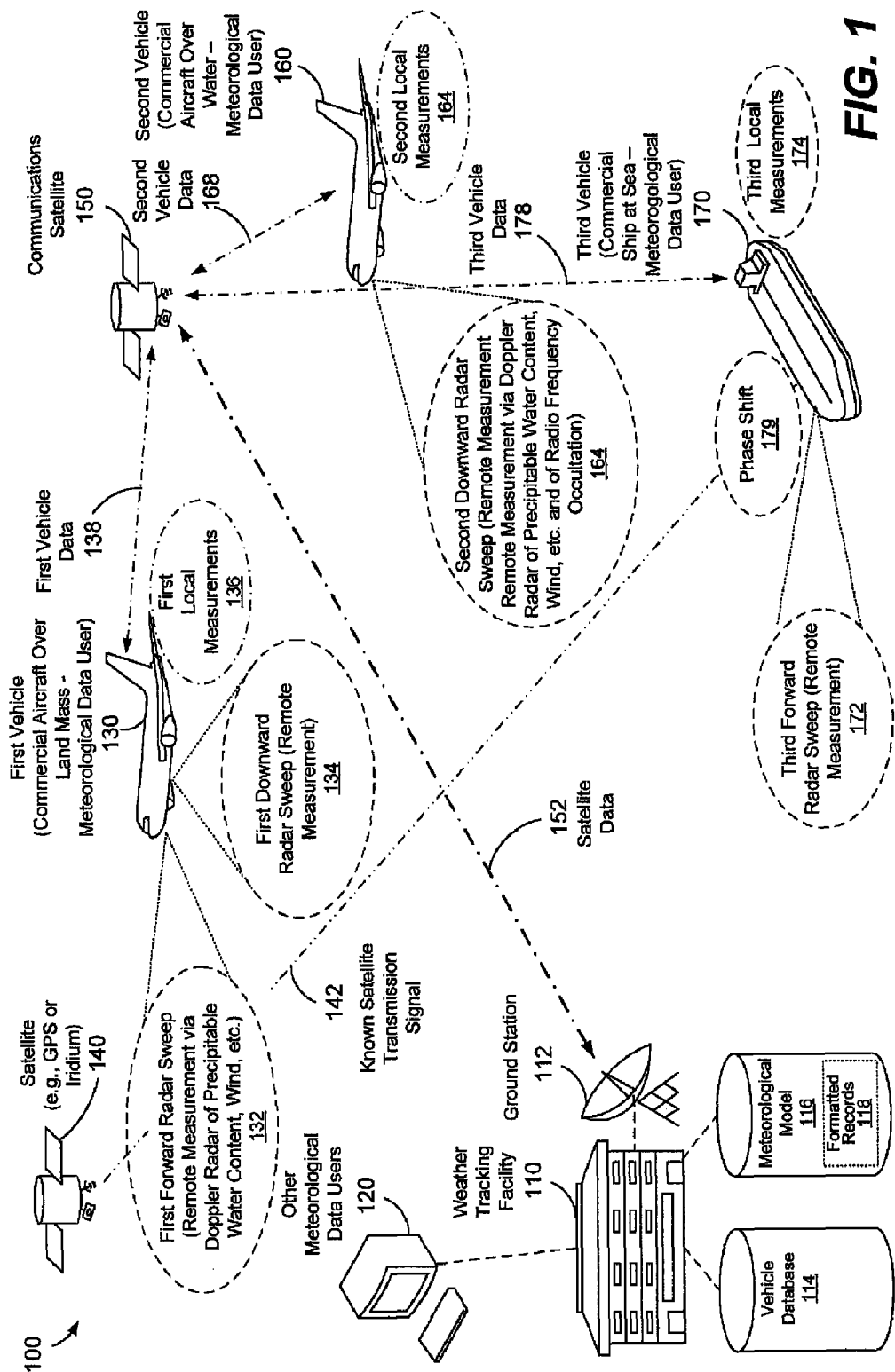
FIG. 1 is a system diagram of a first embodiment of a system for collection of meteorological data by vehicles.

Referring to FIG. 1, a particular embodiment of a system 100 uses a plurality of vehicles 130, 160, and 170 to collect and report data representing weather conditions. The data may be relayed to a weather tracking facility 110 where the data is used along with data from other sources to provide weather information. The weather tracking facility 110 may maintain meteorological data in a meteorological model 116. The meteorological model 116 may include formatted records 118 including one or more weather conditions for locations in one or more regions or for the entire planet. The meteorological data provided by weather stations (including the vehicles 130, 160 and 170) may be received in a format of the formatted records 118 to enable the meteorological data to be directly incorporated in the meteorological model 116. The vehicles 130, 160, and 170 also may be users of the meteorological data collected.

Meteorological data gathering equipment may be positioned at one or more locations near population centers, since it may be relatively convenient to locate, maintain, and monitor the meteorological data gathering equipment near population centers. Further, near populated areas, the interest of the populace in local weather conditions may justify an investment in installing and maintaining meteorological data gathering devices. Conversely, it may be less convenient to install or maintain meteorological data gathering equipment in less populated areas. It may also be difficult to justify the expense of deploying meteorological data gather equipment at locations far removed from an interested populace. Except for research vehicles and some unmanned buoys, there may be very few sources of meteorological data for large portions of the planet. As a result, the meteorological model 116 may have positional or temporal gaps in its meteorological data. Filling these gaps may significantly improve the accuracy and usefulness of the meteorological model 116.

Commercial aircraft, ocean-going ships, and other vehicles may occasionally traverse relatively unpopulated areas or other areas where there are positional or temporal gaps in the meteorological model 116. By using these vehicles as mobile meteorological data platforms, additional meteorological data may be collected to address deficiencies in regional or global meteorological data. The meteorological data gathered by these vehicles may be useful in predicting weather near population centers. The meteorological data gathered may also be used to ascertain or predict the weather along commercial air traffic routes or in shipping lanes, which may help aircraft or ships to avoid dangerous or unwanted weather patterns. The meteorological data collected by these vehicles may be included in the meteorological model 116. In a particular embodiment, the meteorological data collected by the vehicles is formatted to conform to data formats of the formatted records 118 used in the meteorological model 116. When the meteorological data collected is formatted as the formatted records 118, the meteorological data collected may be directly inserted into the meteorological model 116.

In the system 100, the weather tracking facility 110 provides weather reports, weather forecasts, and other data from the meteorological model 116 to meteorological data users including the vehicles 130, 160, and 170 and other meteorological data users 120. For example, meteorological data may be uplinked to the vehicles 130, 160, and 170 as part of communications carried by satellite data 152. The meteorological data also may be communicated from the weather tracking facility 110 by radio transmissions or through other communications media. The weather tracking facility 110 may provide weather information to other meteorological data users 120 via a computer network such as private network or via the Internet. In addition or in the alternative, the meteorological data users 120 may receive weather information in printed form, via broadcast media, or in a number of other forms. The weather tracking facility 110 may receive meteorological data from the vehicles 130 160, and 170 via a ground station 112. In the particular illustrative embodiment of FIG. 1, the vehicles 130, 160, and 170 transmit collected meteorological data to a communications satellite 150. The communications satellite 150 in turn sends a transmission to relay the meteorological data to the ground station 112. Transmitting the meteorological data from the vehicles 130, 160, and 170, via the communications satellite 150 to the ground station 112 is only one possible way of communicating meteorological data to the weather tracking facility 110. For example, the vehicles 130, 160, and 170, may also transmit the meteorological data directly to the weather tracking facility 110 via antennas or via networks (not shown in FIG. 1).

The vehicles 130, 160, and 170 may be programmed before departure or while en route with a modeling grid that indicates where along their routes the vehicles 130, 160, and 170 should collect and transmit meteorological data. In the alternative, the weather tracking facility 110 may contemporaneously request that the vehicles 130, 160, or 170 collect meteorological data at a specified location along the routes traveled by the vehicles 130, 160, or 170.

For example, the weather tracking facility 110 may have access to a database 114 of vehicles to identify when a vehicle that is equipped to collect desired information is or will be at a specified location. For example, the database 114 may include flight plans for a plurality of commercial aircraft. The database 114 may be queried to determine when an aircraft may be the desired location. For another example, the database 114 may also include commercial shipping schedules that indicate what ships follow particular routes. The commercial shipping schedules also may specify when those ships are expected to depart and arrive or actual current locations of ships. The database 114 may also indicate what types of data gathering equipment each vehicle 130, 160, 170 has on board to collect meteorological data. If the database 114 does not indicate what types of data gathering equipment a vehicle has on board, the weather tracking facility may be able to query the vehicle directly. Using the database 114, the weather tracking facility 110 may prepare requests to be distributed to the vehicles 130, 160, or 170 to collect and transmit desired information. The requests may be distributed to the vehicles 130, 160, or 170 before the vehicles 130, 160, or 170 depart or while the vehicles 130, 160, or 170 are in transit.

The meteorological data collected may include data that directly represents weather conditions, such as temperature, pressure, wind speed and direction, and relative humidity. The meteorological data collected also may include "raw" data, such as radar data of areas remote to the vehicles 130, 160, and 170, or readings of satellite transmissions received by the vehicles 130, 160, and 170. The raw data may be processed aboard the vehicles 130, 160, and 170 to derive information regarding potential weather conditions from the raw data.

The type of meteorological data collected may be a function of the location of the vehicles 130, 160, and 170, data-gathering equipment available on the vehicles 130, 160, and 170, and types of data requested by the weather tracking facility 110. For example, a first vehicle 130 may be a commercial aircraft traveling over a land mass. A first forward radar sweep 132 is a remote measurement that may be used to gather data indicative of a number of weather conditions. For example, the first forward radar sweep 132 may detect clear-air turbulence or may identify the presence of precipitable water content. Raw data gathered by the first forward radar sweep 132 includes reflections to transmitted radar signals. Processing algorithms may combine data points collected in the forward radar sweep 132 to identify wind patterns that may indicate the presence of clear-air turbulence. Other processing algorithms may use data from the first forward radar sweep 132 to identify precipitable water content in the air that may result in precipitation. In a particular embodiment, the processed data indicative of weather phenomena is relayed to the weather tracking facility 110 instead of relaying the raw data. Sending the processed data may consume less bandwidth than transmission of the raw data.

The first vehicle 130 may also perform a first downward radar sweep 134. The first downward radar sweep 134 is another remote measurement that, like the first forward radar sweep 132, may identify wind vectors. The first downward radar sweep 134 also may detect the presence of clear-air turbulence, precipitable water content, or both. The first forward radar sweep 132 and the first downward radar sweep 134 are considered to be remote measurements because a radar sweep performed by the first vehicle 130 is used to identify weather conditions at a distance from the first vehicle 130.

Other data gathering equipment aboard the first vehicle 130 may be used to collect meteorological data. For example, first local measurements 136 of precipitation, relative humidity, wind speed, or other weather phenomena may be taken at or adjacent to the first vehicle 130 using sensors mounted on or extending from the vehicle. The remote measurements collected from the first radar sweeps 132 and 134 may represent meteorological conditions in an area within sensor range of the first vehicle 130. The sensor range of the first vehicle 130 may be based on a useful range of particular sensors being used aboard the first vehicle 130. For example, a Rockwell Collins WXR-2100 airborne radar unit manufactured by Rockwell Collins, Inc., of Cedar Rapids, Iowa, may capture high-resolution meteorological measurements of wind speed, turbulence, and RF reflectivity at a range of up to 40 nautical miles. Thus, when the particular sensors being used include these types of airborne radar units, the sensor range of the vehicle 130 may be a radius of 40 nautical miles.

When different types of sensors are used to capture different types of measurements, the sensor range may be greater or smaller. For example, an exemplary typical RF occultation unit can measure refractivity indicative of temperature and humidity anywhere in the troposphere along a line of sight from the vehicle 130 to a satellite. The Earth's curvature limits the sensor range to about 200 miles from the vehicle 130. For another example, when an exemplary airborne LADAR unit is used to measure wind speed, turbulence, and reflectivity based on optical signals, the sensor range is limited to a range of approximately two miles from the vehicle.

The meteorological data gathered from the remote measurements (e.g., the first forward radar sweep 132 and the first downward radar sweep 134) and the first local measurements 136 may be transmitted to the weather tracking facility 110 as first vehicle data 138. The first vehicle data 138 may include a transmission to the ground station 112 of the weather tracking facility 110 via the communications satellite 150. The communications satellite 150 may transmit the meteorological data to the ground station 112 as satellite data 152.

One or more additional vehicles may gather data at one or more other locations. For example, a second vehicle 160 used to gather meteorological data may include a commercial aircraft flying over water. The second vehicle 160 may gather data using a second forward radar sweep (not shown in FIG. 1) or a second downward radar sweep 164. In addition, the second downward radar sweep 164 may be used to measure occultation signals reflected from the surface of the sea. Radio frequency occultation may be used to measure the refractivity of the atmosphere, which may be indicative of various weather phenomena. The second vehicle 160 may take second local measurements 166 at or adjacent to the second vehicle 160. The local measurements 166 may include record wind speed, precipitation, relative humidity, or other conditions that the second vehicle 160 is equipped to measure. The meteorological data that is gathered may be transmitted (e.g. via the communications satellite 150) to the weather tracking facility 110 as second vehicle data 168.

The third vehicle 170 may include a surface ship. Like commercial aircraft, ocean-going ships may be equipped with radar. The third vehicle 170 thus may perform a third forward radar sweep 172 to detect precipitable water content or measure wind vectors. In addition, the third vehicle 170 may take third local measurements 174. The third local measurements 174 may include wind speed, sea conditions, precipitation, relative humidity, or other data that the third vehicle 170 is equipped to collect.

In addition to performing measurements using radar or other instruments, the vehicles 130, 160, and 170 also may measure a phase shift 179 in a known satellite transmission signal 142. The known satellite transmission signal 142 may include a downlink signal from a communications satellite 140, such as an Iridium telephony satellite or a positioning signal from a global positioning system (GPS) satellite. Atmospheric phenomena may cause the phase shift 179 in the known satellite transmission signal 142 from which weather phenomena may also be determined. The data regarding the phase shift 179 may first be processed aboard the third vehicle 170. The third vehicle 170 may then transmit specific weather-related data rather than sending what may be more voluminous raw data. The meteorological data that is gathered may be transmitted (e.g., via the communications satellite 150) to the weather tracking facility 110 as third vehicle data 178.

As further explained with reference to FIGS. 2-5, according to particular embodiments, the vehicles 130, 160, and 170 may gather and transmit meteorological data only when the vehicles 130, 160, and 170 are at an area or close to an area for which the weather tracking facility 110 does not have another currently available source of meteorological data. For example, when the third vehicle 170 (i.e., the ship) passes close to a buoy that supports a meteorological data gathering station, the third vehicle 170 may not to consume transmission bandwidth by sending duplicative data. In another example, an aircraft at a certain altitude may not be able to provide any useful or new meteorological data. Thus, the aircraft may not send meteorological data while flying at this altitude. However, when the vehicles 130, 160, and 170 are travelling through areas for which the weather tracking facility 110 lacks meteorological data, the vehicles 130, 160, and 170 may collect and transmit the desired data.

A modeling grid may be maintained by the weather tracking facility 110 or by the vehicles 130, 160, and 170 to identify locations where it may be helpful for the vehicles 130, 160, and 170 to gather meteorological data. When the modeling grid is maintained aboard the vehicles 130, 160, and 170, the vehicles 130, 160, and 170 may initiate taking measurements and transmit the resulting data based on the modeling grid. When the modeling grid is maintained by the weather tracking facility 110, and the weather tracking facility 110 may track the position or expected position of the vehicles 130, 160, and 170. The weather tracking facility 110 may send a request to one of the vehicles 130, 160, and 170 to collect meteorological data at a particular position based on the modeling grid. The satellite data 152 may include requests transmitted by the weather tracking facility 110 via the ground station 112 for the vehicles 130, 160, and 170 to collect meteorological data.

Figure 2:
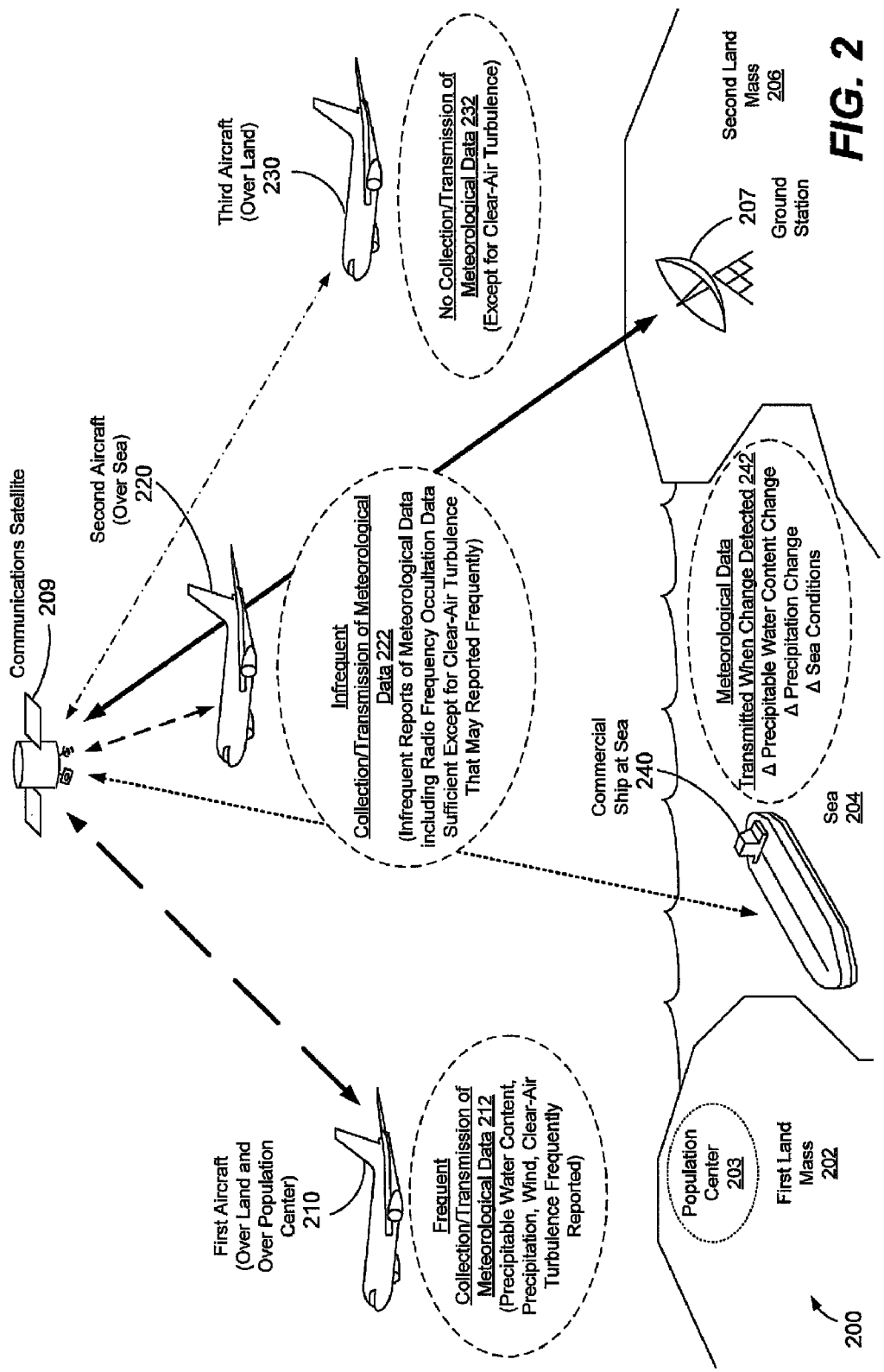
FIG. 2 is a system diagram of a second embodiment of a system for collection of meteorological data by vehicles.

FIG. 2 is a diagram depicting a particular embodiment of a system 200 that uses a plurality of vehicles 210, 220, 230, and 240 as mobile platforms to collect and report meteorological data at different rates. The meteorological data may be sent at different rates depending on a location of each of the vehicles 210, 220, 230, and 240 and weather conditions at the location. In FIG. 2, the vehicles 210, 220, 230, and 240 are illustrated at different positions relative to a first land mass 202, a body of water (e.g., a sea 204), a second land mass 206, and a population center 203 on the first land mass 202. The vehicles 210, 220, 230, and 240 may communicate with a weather tracking facility (such as the weather tracking facility 110 of FIG. 1) via a communications satellite 209 and a ground station 207. Additionally or in the alternative, the vehicles 210, 220, 230, and 240 may communicate with the weather tracking facility (or a weather tracking network), via antennas or other communications devices.

In the example illustrated in FIG. 2, a first vehicle 210 (e.g., a first aircraft) is flying over the first land mass 202 and close to the population center 203. The population center 203 may include its own weather station (not shown). Nonetheless, the importance of accurate weather reporting and forecasting close to the population center 203 may warrant frequent collection and transmission of meteorological data 212 to enhance the accuracy of weather forecasting close to the population center 203. For example, the first vehicle 210 may frequently sample and transmit data describing precipitable water, precipitation, wind, clear-air turbulence, other meteorological phenomena, or any combination thereof.

A second vehicle 220 (e.g., a second aircraft) is illustrated traveling over the sea 204. The second vehicle 220 may collect and transmit of meteorological data 222 relatively infrequently (as compared to a collection and transmission frequency of the first vehicle 210). The meteorological data may be collected and transmitted less frequently by the second vehicle 220 for several reasons. For example, at the position of the second vehicle 220 over the sea 204, the meteorological data may have little bearing on the weather conditions at the population center 203 or at other points of interest. As another example, the second vehicle 220 may be flying at an altitude that is too high for the second vehicle 220 to collect helpful meteorological data. To illustrate, at a high altitude, local measurements may be insignificant (e.g., not pertinent to meteorological modeling). Further, instruments aboard the second vehicle 220 may not be able to make accurate remote measurements of meteorological data close to points of interest or that may affect points of interest. As a result, less frequent data collection and transmission may be sufficient to account for weather conditions over the sea 204. However, the second vehicle 220 may collect and transmit data related to certain meteorological conditions more frequently than others. For example, the second vehicle 220 may collect and transmit data regarding conditions that may be important to other aircraft travelling a similar route (such as data regarding clear-air turbulence) relatively frequently.

A third vehicle 230 (e.g., a third aircraft) is illustrated flying over the second land mass 206. The third vehicle 230 may collect and transmit no meteorological data 232. For example, the second land mass 206 may be so distant to points of interest that there are no requests for any aircraft flying over the second land mass 206 to collect and send meteorological data. As another example, the meteorological data over the second land mass 206 may be known to be relatively constant or may be measured by other data gathering systems. In either case, there may be no request for the third vehicle 230 to collect and transmit meteorological data based on the position of the third vehicle 230. However, the third vehicle 230 may collect and transmit data that may be of interest to other aircraft (such as clear air turbulence data).

A fourth vehicle (e.g., the ship 240 at sea 204) may be directed to transmit meteorological data 242 only when a change in one or more measurements is detected. The ship 240 may regularly measure meteorological data but may only transmit the data when a change is detected. To illustrate, weather conditions at a location of the ship 240 may change relatively infrequently. As a result, transmission bandwidth may be conserved by avoiding repeatedly send the same measurements. The ship 240 may be requested to transmit meteorological data when one or more conditions change. For example, the ship 240 may be requested to transmit meteorological data when one or more quantities, such as precipitable water, precipitation, or sea conditions change (e.g., by a threshold amount). Further, the ship 240 may be requested to transmit only meteorological data for the one or more conditions that have changed. For example, if the sea conditions change but other meteorological data remain constant, the ship 240 may transmit only the change in the sea conditions. One may note that, because the ship 240 travels more slowly than the aircraft (e.g., the vehicles 210, 220, and 230), the meteorological data that the ship 240 encounters may be expected to change more slowly.

Each of the vehicles 210, 220, 230, and 240 may be preprogrammed with a modeling grid that is used to determine when the vehicle 210, 220, 230, and 240 should collect and transmit particular data. For example, if all of the vehicles 210, 220, 230, and 240 carry the modeling grid, each of the vehicles 210, 220, 230, and 240 can compare its current position with coordinates on the grid to determine how frequently data should be sampled or transmitted. To illustrate, the modeling grid may indicate that an aircraft at the position (e.g., ground position, altitude, or both) of the first vehicle 210 should send data frequently. Correspondingly, the modeling grid may indicate to the third aircraft 230 that it should not collect and send meteorological data.

Alternatively, a weather tracking facility, such as the weather tracking facility 110 of FIG. 1, or another node of a data collection system (e.g., the ground station 207) may maintain the modeling grid and may track positions or expected positions of the vehicles 210, 220, 230, and 240. The weather tracking facility can request that measurements be taken and that data be transmitted when a particular vehicle 210, 220, 230, and 240 reaches a position of interest to the weather tracking facility.

Figure 3:
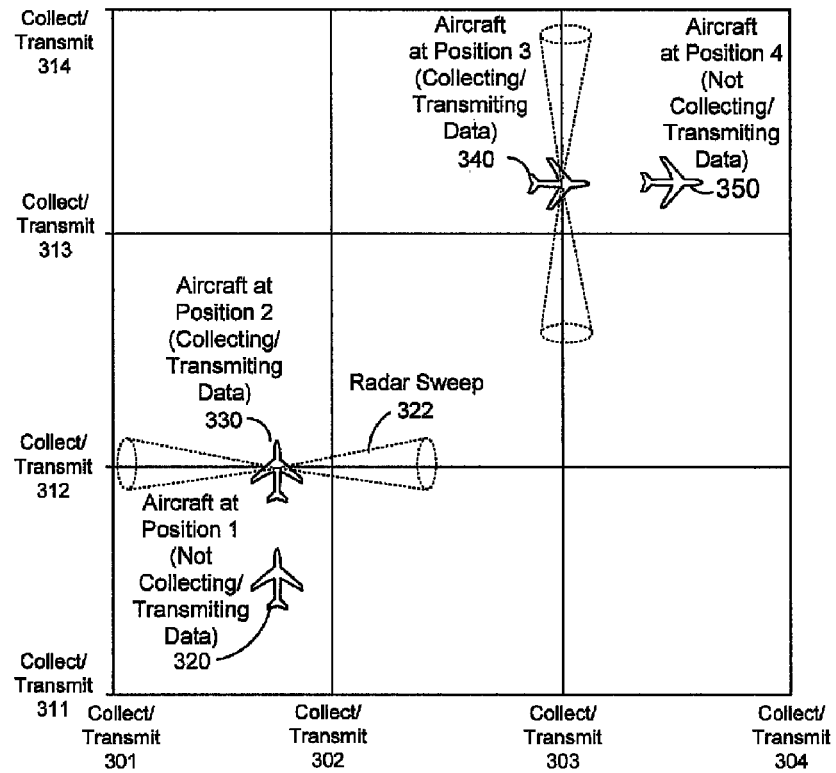
FIGS. 3 and 4 are illustrative diagrams of modeling grids used by an embodiment of a system collection of meteorological data by vehicles.
Figure 4:
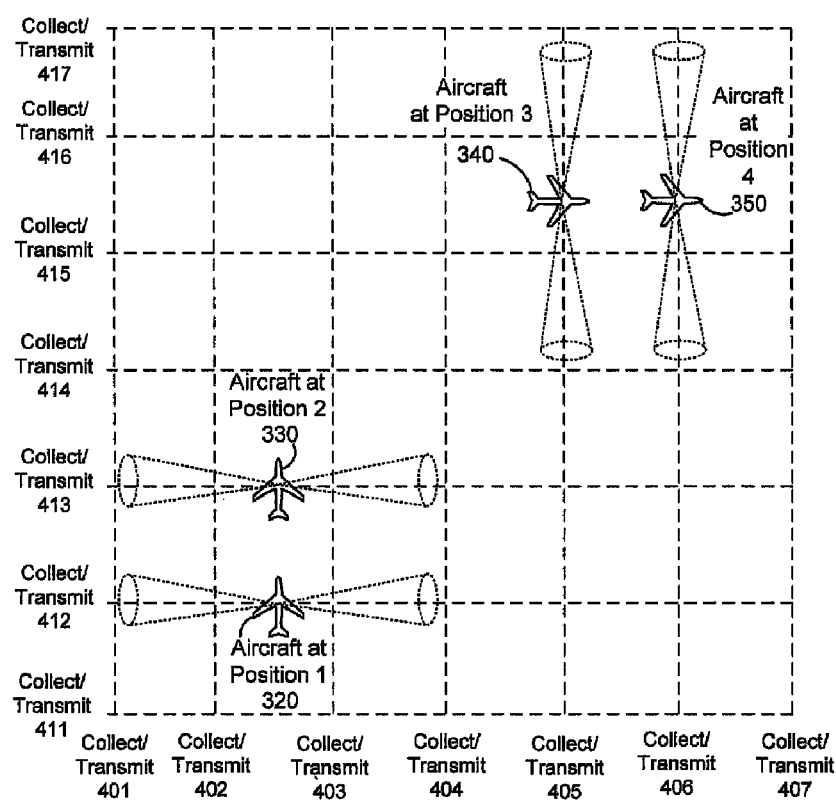

FIGS. 3 and 4 are diagrams of modeling grids 300 and 400, respectively. The modeling grids 300 and 400 may be used to identify when a vehicle is in proximity to a location at which meteorological data is to be gathered. The position of the vehicle may be determined, for example, using global positioning system (GPS) signals or other tracking systems. By comparing the position of the vehicle with a relevant modeling grid, such as modeling grid 300 or 400, it may be automatically determined when the vehicle is in proximity to a location at which meteorological data is to be collected and transmitted.

The modeling grid 300 of FIG. 3 directs vehicles to collect and transmit meteorological data at a first sampling rate. The modeling grid 400 of FIG. 4 directs vehicles to collect and transmit meteorological data at a second sampling rate. The second sampling rate of the modeling grid 400 is higher than the first sampling rate of the modeling grid 300. Thus, the modeling grid 400 may be used when weather conditions are of greater interest or when the weather conditions are expected to change more frequently. Both FIGS. 3 and 4 show aircraft at the same positions 320, 330, 330, and 340. In response to the different modeling grids 300 and 400, however, the aircraft at the positions 320, 330, 340, and 350 collect and transmit meteorological data at different sampling rates.

The first modeling grid 300 includes a plurality of collect/transmit lines 301-304 and 311-314. The collect/transmit lines 301-304 and 311-314 may identify surface coordinates of a plurality of locations at which meteorological data is to be collected and transmitted. The surface coordinates may include latitude, longitude, or coordinates in another coordinate system. The plurality of locations also may be identified according to altitude.

The second modeling grid 400 includes a plurality of more closely positioned collect/transmit lines 401-407 and 411-417. As a vehicle cross each of the collect/transmit lines 301-304, 311-314, 401-407, and 411-417, the vehicle may be prompted to collect and transmit meteorological data. For example, for aircraft traveling at a particular speed, the more closely positioned collect/transmit lines 401-407 and 411-417 of the second modeling grid 400 prompt the aircraft to collect and transmit the meteorological data more frequently than the collect/transmit lines 301-304 and 311-314 of the first modeling grid 300.

The modeling grids 300 and 400 may also specify what categories of meteorological data should be collected and transmitted. The modeling grids 300 and 400 may also indicate whether the meteorological data should be transmitted only when the data values change.

In the first modeling grid 300, an aircraft at a first position 320 is between collect/transmit lines 311 and 312. The aircraft at the first position 320 is not prompted to collect and transmit meteorological data since the aircraft is not at a collect/transmit line. After continuing to fly in a particular direction, the aircraft may arrive at a second position 330 and cross the collect/transmit line 312. Accordingly, the aircraft at the second position 330 may be prompted to collect and transmit meteorological data (e.g., by performing a radar sweep 322 and transmit the results). An aircraft flying in another direction may reach a third position 340 and cross the collect/transmit line 303. The aircraft at the third position 340 may be therefore be prompted to collect and transmit meteorological data. After continuing to fly in the same direction, the aircraft may arrive at the fourth position 350, which is between the collect/transmit line 303 and the collect/transmit line 304. The aircraft at the fourth position 340 therefore is not prompted to collect and transmit meteorological data.

Referring to FIG. 4, the aircraft reaches the same positions 320, 330, 340, and 350 as in FIG. 3. However, because the collect/transmit lines 401-407 and 411-417 in the second modeling grid 400 FIG. 4 are more closely placed than in the first modeling grid 300 of FIG. 3, the aircraft in FIG. 4 collects and transmits meteorological data at a different rate than in FIG. 3. Using the second modeling grid 400, the aircraft cross collect/transmit lines 412, 413, 405, and 406, at each of the first position 320, the second position 330, the third position 340, and the fourth position 350.

The modeling grids 300 and 400 may vary based on proximity (laterally or in altitude) to land, population centers, or other points of interest. The modeling grids 300 and 400 also may represent different data collection and transmission patterns for the same surface coordinates but at different altitudes. For example, the first modeling grid 300 may specify the plurality of locations at which meteorological data is to be gathered at an altitude over a certain threshold. The second modeling grid 400 may specify the plurality of locations at which meteorological data is to be gathered at a lower altitude that, for example, may be closer to a point of interest. The modeling grids 300 and 400 also may vary based on predetermined significance of the weather in the area or may vary based on other factors.

Between FIGS. 3 and 4, density of the latitudinal collect/transmit lines 311-314 and 411-417 and density longitudinal collect/transmit lines 301-304 and 411-417 increases in equal portion. However, particular embodiments may increase the density of meteorological data gathering and reporting differently. For example, latitudinal collection/transmission lines 311-314 and 411-417 may have a greater or lesser relative density than longitudinal collection/transmission lines 301-304 and 401-407. For example, different densities or grid patterns may be used to gather information about weather patterns that have known or expected variations.

Note that the modeling grids 300 and 400 may be carried aboard the aircraft or may be maintained at weather tracking facilities. When the modeling grid 300 or 400 is maintained aboard an aircraft, the modeling grid 300 or 400 may be loaded into a computer system aboard the vehicle before the vehicle departs or while the vehicle is in transit. When the modeling grid 300 or 400 is kept aboard an aircraft, the aircraft at the first position 320 may monitor its own position relative to the modeling grid 300 or 400. Upon reaching one of the collect/transmit lines 301-304, 311-314, 401-407, and 411-417, the aircraft itself may initiate collection and transmission of meteorological data. By contrast, when the modeling grid is maintained at a weather tracking facility, the weather tracking facility may compare an expected position or actual position of an aircraft with the modeling grid 300 or 400. The weather tracking facility may then transmit a request for meteorological data be gathered and sent when the weather tracking facility determines the aircraft crosses or is expected to cross one of the collect/transmit lines 301-304, 311-314, 401-407, and 411-417.

Figure 5:
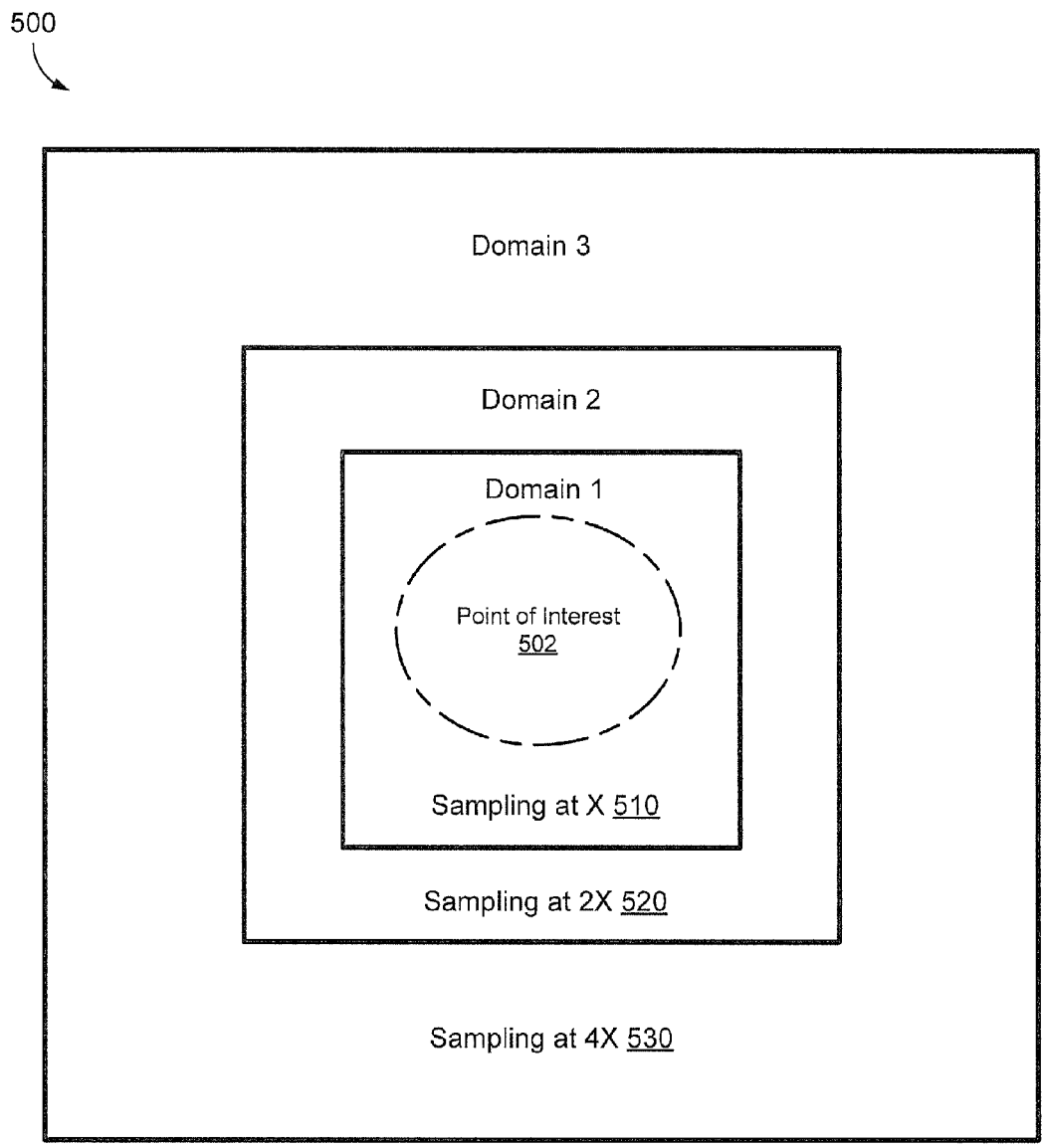
FIG. 5 is an illustrative diagram indicating increasing density of weather collection points as a function of proximity to a point of interest.

FIG. 5 illustrates that the rate at which meteorological data is collected and transmitted in an area may vary based on a distance from point of interest 502, such as a land mass, population center, or other feature. Referring to FIG. 5, a map 500 shows a plurality of domains 510, 520, and 530 arranged around the point of interest 502. In domains closer to the point of interest 502, meteorological data is collected and transmitted more frequently than in domains further away from the point of interest 502. In one embodiment, the meteorological data is collected and transmitted based on a modeling grid, such as described with reference to FIGS. 3 and 4. In the example of FIGS. 3 and 4, the frequency with which the meteorological data is collected is based on spacing between the collect/transmit lines. In another example, the meteorological data may be collected and transmitted periodically. Thus, a distance between collection and transmission points may depend on a speed of the vehicle.

For example, in a first domain 510 closest to the point of interest 502, the weather is sampled at a first frequency, X, where X is determined based on a unit of distance or a unit of time. Moving away from the point of interest 502 into a second domain 520, the meteorological data may be sampled at a second frequency that is less than the first frequency. For example, the second frequency may be X/2, or one-half as frequently as in the first domain 510. Moving still further away from the point of interest 502 into a third domain 530, the meteorological data may be sampled at a third frequency that is less than the second frequency. For example, the third frequency may be X/4, or one-half as frequently as in the second domain 520. The in frequency of collection and transmission may change arithmetically, geometrically, or at another regular or irregular rate.

Figure 6:
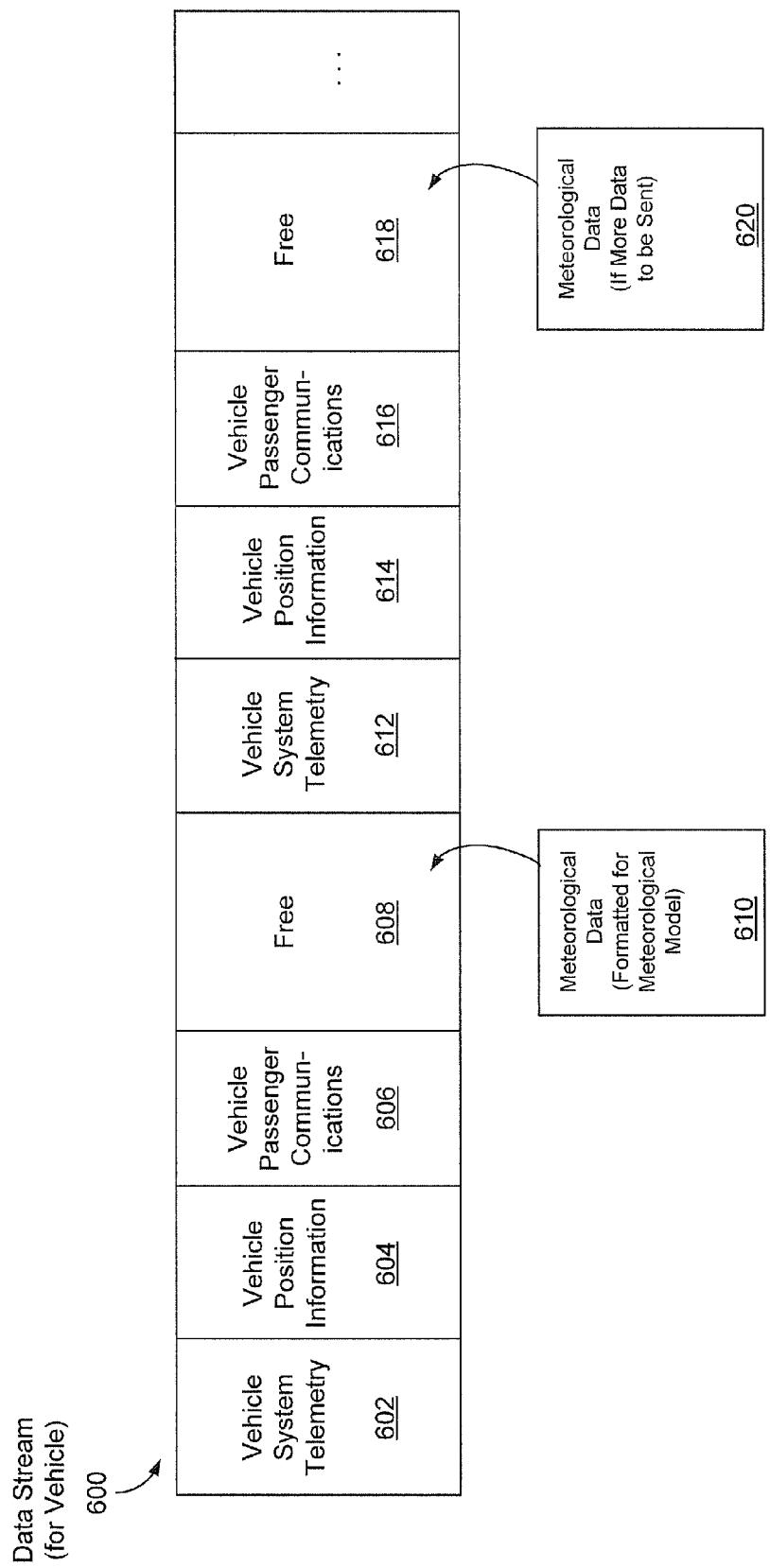
FIG. 6 is a data flow diagram of a data stream sent by a vehicle to a weather tracking facility.

FIG. 6 is a diagram illustrating a data stream 600. The data stream 600 may include free portions 608 and 618 in which meteorological data may be transmitted. Aircraft, ships, or other vehicles may transmit telemetry or other data. In a particular embodiment, meteorological data may be transmitted using the same equipment used to transmit the telemetry or other data. It may be desirable not to disrupt communication of the telemetry or other data. Accordingly, portions of transmission bandwidth that are unused at a particular time, such as free portions 608 and 618, may be used to transmit the meteorological data without changing or interfering with other communications.

For example, the data stream 600 may already include operation and maintenance vehicle system telemetry 602 and 612, vehicle position information 604 and 614, vehicle passenger communications (voice or data) 606 and 616, or any combination thereof. In order to include meteorological data transmissions in the data stream 600 without disrupting other communications applications, the free portions 608 and 618 may be identified (or created). Meteorological data 610 and 620 may be sent in the previously free portions 608 and 618 of the data stream. Depending on the position of the vehicle or other conditions, there may be more meteorological data to send at some times than at others. Accordingly, only some of the free portions 608 and 618 may actually be used to transmit the meteorological data 610 and 620 at a particular time. For example, a first free portion 608 may be regularly used for transmitting meteorological data 610. A second free portion 618 may also be used only when there is additional meteorological data, such as meteorological data 620, to be sent at a particular time.

In a particular embodiment, the meteorological data included in the free portions 608 and 618 of the data stream 600 is formatted to be incorporated in a meteorological model. For example, FIG. 1 describes a meteorological model 116 that maintains meteorological data in a plurality of formatted records 118. By formatting the meteorological data 610 and 620 in the format used in the formatted records 118, the meteorological data 610 and 620 may be directly inserted into the meteorological model 116 along with meteorological data collected from weather stations, satellites, or other sources.

The format used by the formatted records may prescribe which data elements are stored and how they are stored. For example, the format may specify that position information for the location where the meteorological data was collected is to be presented first. The format may specify that a time at which the data was collected is to be specified second. The format may also specify data identifiers used to label types of data, whether the data includes temperature data, wind data, etc. The format may also allow for multiple types of data elements to be included in a formatted record and whether those multiple data elements should appear in a particular order. In a particular embodiment, the meteorological data 610 or 620 is stored and transmitted according to the specified format to facilitate including the meteorological data 610 or 620 in a meteorological model or database. The format also may indicate what elements of meteorological data may be used in a particular meteorological model. The meteorological data sent may be filtered at the vehicle to avoid potentially wasting bandwidth in transmitting data by excluding data that is not used by the meteorological model.

Figure 7:
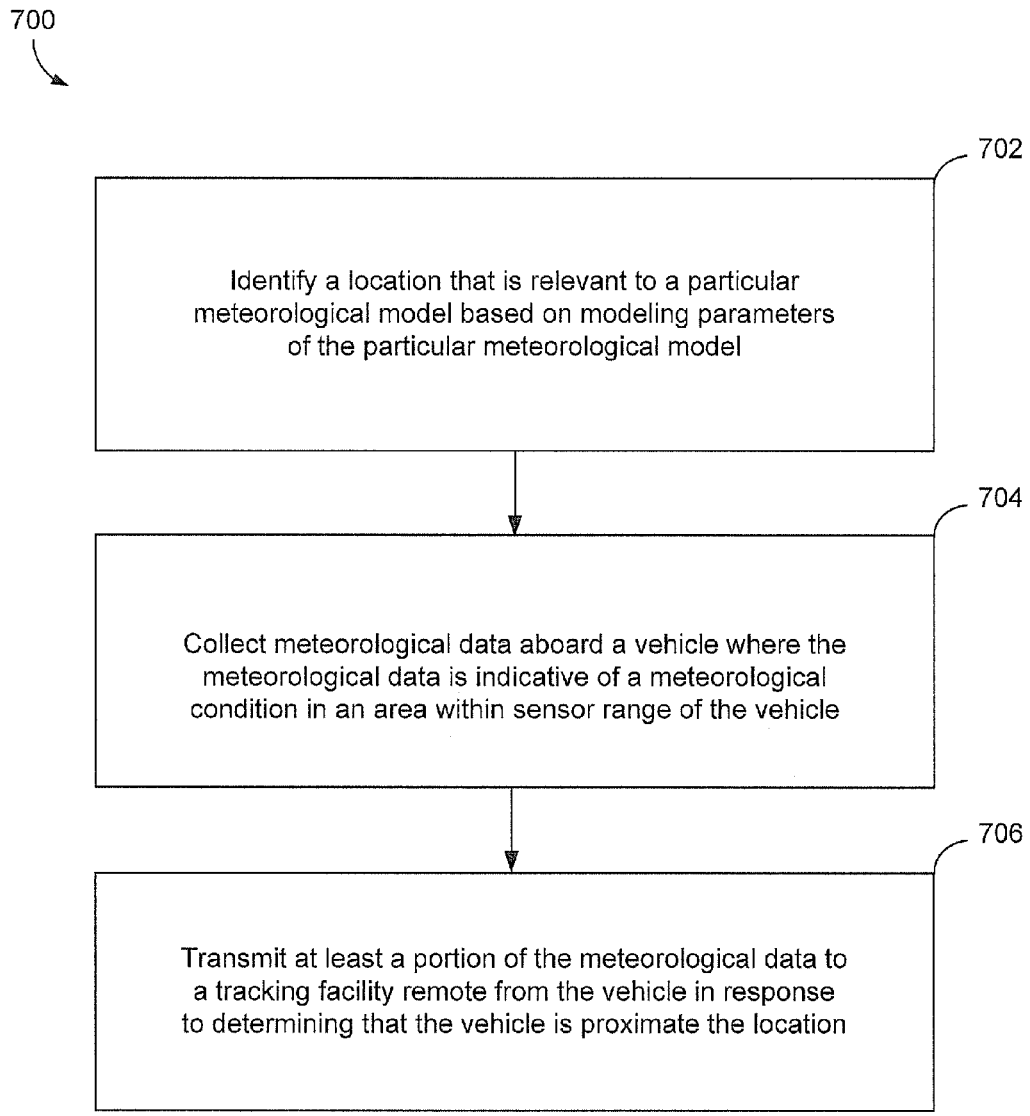
FIG. 7 is a flow diagram of a first embodiment of a method for collection of meteorological data by vehicles.

FIG. 7 is a flow diagram of a particular embodiment of a method 700 of collecting meteorological data. For example, the method 700 may be performed at a mobile platform that collects meteorological data and transmits at least a portion of the meteorological data to a weather tracking facility. A location is identified that is relevant to a particular meteorological model based on parameters of the particular meteorological model, at 702. For example, relevance of a location may be based on distance to a populated area or point of interest, altitude, and other conditions. To illustrate, the location may be identified from a modeling grid carried aboard the vehicle. The vehicle may monitor its position relative to the modeling grid to identify a location at which meteorological data may be relevant to a particular meteorological model.

Meteorological data is collected aboard a vehicle, at 704. The meteorological data is indicative of a meteorological condition in an area within sensor range of the vehicle. For example, referring to FIG. 1, precipitable water content data and wind data may be collected in remote measurements made via radar sweeps 132 and 134. Other meteorological data is measured locally 136 by the first vehicle 130. At least a portion of the meteorological data is transmitted to a tracking facility from the first vehicle 130 in response to determining the first vehicle 130 is proximate the location, at 706.

Figure 8:
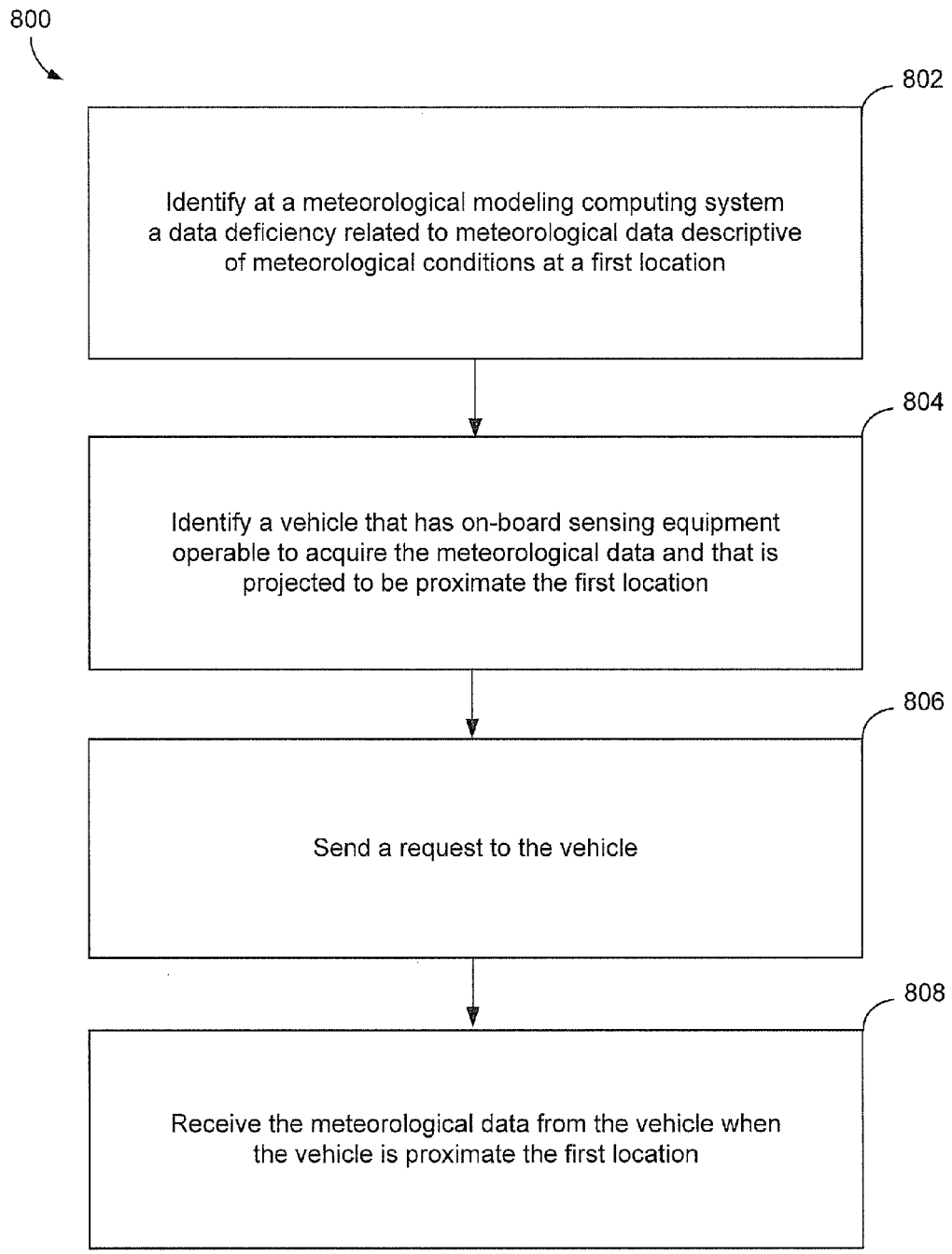
FIG. 8 is a flow diagram of a second embodiment of a method for collection of meteorological data by vehicles.

FIG. 8 is a flow diagram of another particular embodiment of a method 800 of collecting meteorological data. For example, the method 800 may be performed at a weather tracking facility to request an appropriately equipped vehicle to send meteorological data regarding a location at or within sensor range of the location of the vehicle. A data deficiency at a first location is identified, at 802. The data deficiency may be descriptive of meteorological conditions at the first location. The data deficiency may be identified by a meteorological modeling system. To illustrate, the meteorological modeling system may determine that it has no current data of a particular type (e.g., wind speed, precipitation, temperature, etc.) at a particular location.

A vehicle that has on-board sensing equipment operable to acquire the meteorological data and that is projected to be proximate the first location is identified, at 804. For example, the weather tracking facility 110 of FIG. 1 may send a request for meteorological data based on an actual or expected position of the first vehicle 130 relative to a location on a modeling grid. A request for meteorological data is sent to the vehicle, at 806. The request may be sent directly to the vehicle or indirectly via a communications satellite. The meteorological data may be received from the vehicle when the vehicle is proximate to the first location, at 808.

Figure 9:
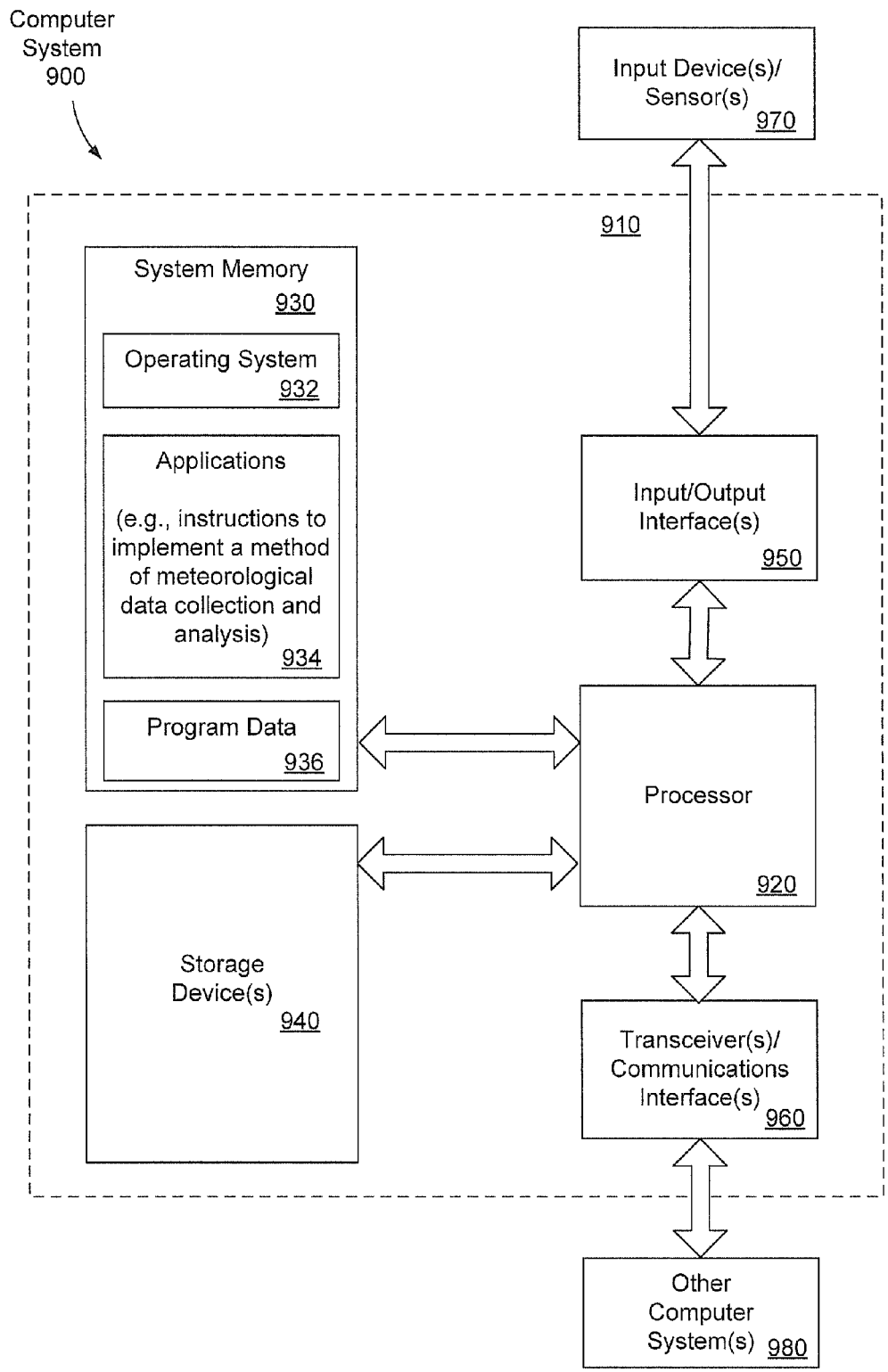
FIG. 9 is a block diagram of a general purpose computer system operable to implement embodiments of computer-implemented methods and computer-executable instructions.

Thus, using the method 800 of FIG. 8, the method 900 of FIG. 9, or a combination thereof, deficiencies in meteorological data for a particular location may be supplemented by reports received from vehicles traveling over or through that location. Acquiring the meteorological data for locations for which data was not previously available may provide more complete weather tracking or more accurate weather forecasting. Using vehicles to collect the meteorological data avoids the expense of installing and maintaining weather stations at those locations. Using vehicles such as commercial vehicles that happen to travel through that location also avoids the expense of directing potentially scarce resources, such as satellites or weather research vehicles, to secure meteorological data for that location.

FIG. 9 is a block diagram of a general purpose computer system 900 operable to implement embodiments of computer-implemented methods and computer-executable instructions. The computer system 900 may be positioned aboard a vehicle. To illustrate, the computer system 900 may be aboard an aircraft, such as the first vehicle 130 or the second vehicle 160 of FIG. 1. The computer system 900 may be aboard a ship, such as the third vehicle 170 of FIG. 1. The computer system 900 also may be deployed at the weather tracking facility 110. In an illustrative embodiment, the computer system 900 may include at least one processor 920, alternatively described as a data processor 920. When aboard a vehicle, the processor 920 may be configured to execute instructions to implement a method of selectively initiating the collection and transmission of meteorological data. When deployed at a weather tracking facility, the processor 920 may be configured to request the collection and transmission of meteorological data from a vehicle. The collection and transmission of meteorological data thus may be initiated aboard the vehicle or in response to a signal received from off-board the vehicle. A modeling grid stored in a system memory 930 may be accessed by the processor 920 to identify when the data collection and transmission should be requested or initiated.

The processor 920 may communicate with the system memory 930, one or more storage devices 940, and one or more input devices 970. The input devices 970 may include sensors or data gathering devices to collect meteorological data. The meteorological data may include raw data that indicates weather conditions presently existing at one or more locations. The raw data may then be processed by the processor 920 to generate processed data configured to represent the weather conditions presently existing at the one or more locations. The processor may communicate with the one or more input devices 970 via input/output interfaces 950. The processor 920 also may use one or more transceivers or other communications interfaces 960 to communicate with one or more other computer systems 980. The other computer systems 980 may include computer systems 980 aboard a vehicle or at a weather tracking facility.

The system memory 930 may include volatile memory devices, such as random access memory (RAM) devices, and nonvolatile memory devices, such as read-only memory (ROM), programmable read-only memory, and flash memory. The system memory 930 may include an operating system 932, which may include a basic/input output system for booting the computer system 900 as well as a full operating system to enable the computer system 900 to interact with users, other programs, and other devices. The system memory 930 may also include one or more application programs 934, such as instructions for configuring the computer system to collect and analyze meteorological data.

The processor 920 also may communicate with one or more storage devices 940. The storage devices 940 may include nonvolatile storage devices, such as magnetic disks, optical disks, or flash memory devices. In an alternative embodiment, the storage devices 940 may be configured to store the operating system 932, the applications 934, the program data 936, or any combination thereof. The processor 920 may communicate with the one or more communication interfaces 960 to enable the computer system 900 to communicate with other computer systems 980.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
   identifying a location that is relevant to a particular meteorological model based on modeling parameters of the particular meteorological model;
   collecting meteorological data aboard a vehicle, wherein the meteorological data is indicative of a meteorological condition in an area within sensor range of the vehicle; and transmitting at least a portion of the meteorological data to a modeling station remote from the vehicle in response to determining that the vehicle is proximate the location.

2. The method of claim 1, further comprising filtering the meteorological data aboard the vehicle to select the portion of the meteorological data, wherein the portion of the meteorological data excludes data that is not used by the particular meteorological model.

3. The method of claim 1, wherein the location is identified based on a modeling grid of the particular meteorological model, wherein the modeling grid identifies a plurality of locations of the particular meteorological model.

4. The method of claim 3, wherein the plurality of locations identified by the modeling grid are specified by surface coordinates.

5. The method of claim 3, wherein the plurality of locations are spaced closer together close to more populous areas and are spaced further apart in less populous areas.

6. The method of claim 3, wherein each of the plurality of locations identified by the modeling grid is specified by altitude.

7. The method of claim 3, wherein information related to the modeling grid is stored in a memory aboard the vehicle and wherein proximity of the vehicle to the location is determined automatically based on the modeling grid.

8. The method of claim 1, further comprising:
receiving a request from the modeling station when the vehicle is not proximate the location; and
transmitting at least the portion of the meteorological data specified in the request to the modeling station in response to the request.

9. The method of claim 1, wherein the meteorological data is collected in response to determining that the vehicle is proximate the location.

10. The method of claim 1, further comprising formatting the portion of the meteorological data that is transmitted in a format recognized by the particular meteorological model.

11. The method of claim 1, wherein the meteorological data includes at least one of local measurements and remote measurements, wherein the local measurements include one or more of:
wind data;
relative humidity;
sea conditions;
precipitation; and
phase shift of known data transmissions; and
wherein the remote measurements include one of more of:
precipitable water content;
wind data; and
radio frequency occultation.

12. The method of claim 11, wherein the remote measurements include radar data.

13. The method of claim 11, wherein the known data transmissions include at least one of global positioning satellite transmissions and communications satellite transmissions.

14. A method, comprising:
identifying, at a meteorological modeling computing system, a data deficiency related to meteorological data descriptive of weather conditions at a first location;
identifying a vehicle that has on-board sensing equipment operable to acquire the meteorological data and that is projected to be proximate the first location;
sending a request to the vehicle; and
receiving the meteorological data from the vehicle when the vehicle is proximate the first location.

15. The method of claim 14, further comprising receiving second meteorological data at the meteorological modeling computing system from a second vehicle that automatically collected the second meteorological data and automatically transmitted the second meteorological data in response to the second vehicle being proximate to a second location.

16. The method of claim 14, wherein identifying the vehicle comprises:
sending a query to a database that includes flight plans for a plurality of commercial aircraft;
receiving a response to the query that identifies at least one commercial aircraft associated with a flight plan that approximately intersects the first location; and
determining whether the at least one commercial aircraft includes onboard equipment to collect the meteorological data.

17. The method of claim 16, wherein the request is sent to the at least one commercial aircraft before the commercial aircraft departs or while the commercial aircraft is in transit.

18. A mobile platform, comprising:
one or more sensors operable to collect raw data associated with weather conditions;
a processor coupled to the sensors and operable to:
receive the raw data from the one or more sensors;
receive a request derived from a meteorological model that indicates a location;
in response to the request, generate, based on at least a portion of the raw data, processed data that indicates weather conditions associated with the location indicated by the request; and
a transceiver coupled to the processor and configured to send the processed data to a receiving station.

19. The mobile platform of claim 18, wherein the mobile platform includes an aircraft or a ship, wherein the receiving station is proximate to the location indicated by the request, and wherein the meteorological model is accessible to the receiving station.

20. The mobile platform of claim 18, wherein the processor is configured to determine whether a location of the mobile platform in corresponds to the location indicated by the request based on at least one of:
a modeling grid stored at the mobile platform; and
a signal received from off-board the mobile platform.

* * * * *